United States Patent [19]
Jones

[11] 3,961,973
[45] June 8, 1976

[54] LIGHTWEIGHT AGGREGATE

[75] Inventor: Dennis A. Jones, Vandalia, Ohio

[73] Assignee: Amax Resource Recovery Systems, Inc., Dayton, Ohio

[22] Filed: July 19, 1974

[21] Appl. No.: 489,905

[52] U.S. Cl. .................................. 106/98
[51] Int. Cl.$^2$ .......................... C04B 7/02
[58] Field of Search .................. 106/97, 98

[56] References Cited
UNITED STATES PATENTS

| | | | |
|---|---|---|---|
| 2,250,107 | 7/1941 | Nelles | 106/97 |
| 2,315,732 | 4/1943 | Patch | 106/97 |
| 2,414,734 | 1/1947 | Gelbman | 106/97 |

*Primary Examiner*—J. Poer
*Attorney, Agent, or Firm*—Biebel, French & Bugg

[57] ABSTRACT

A lightweight aggregate for use in concrete mixes with Portland cement consists essentially of bottom ash produced as a by-product of burning pulverized coal in a dry-bottom furnace. The ash is sized to remove particles substantially exceeding ⅜ inch in diameter. It is substantially free of iron pyrites and sulfur trioxide to provide a lightweight aggregate which is inert, non-reactive, and meets the requirements for such aggregate as defined in ASTM specifications C-330, C-331 and C-332. Methods of producing this aggregate material are disclosed, including a method for recovering the same from the waste product ash in a power plant sluicing pond. Concrete mixes and products are disclosed in which such ash consists of the lightweight aggregate.

7 Claims, 7 Drawing Figures

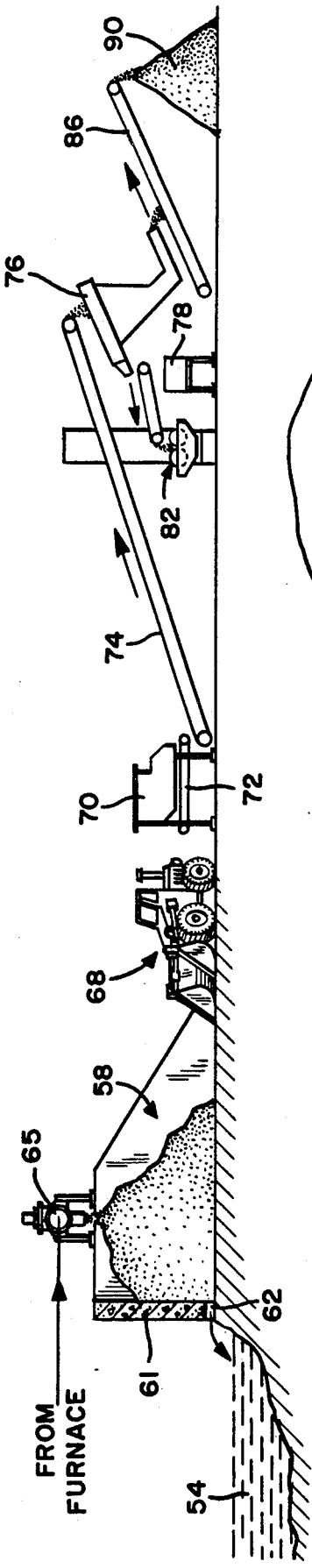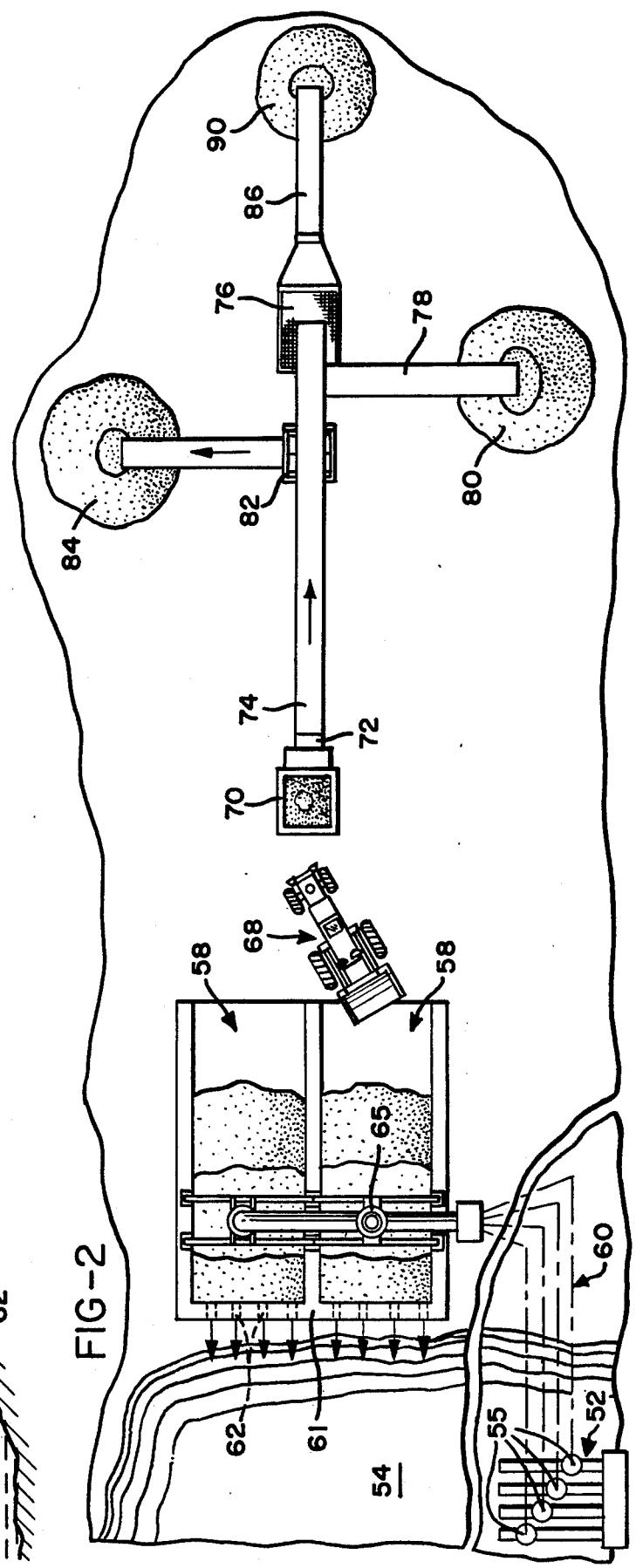

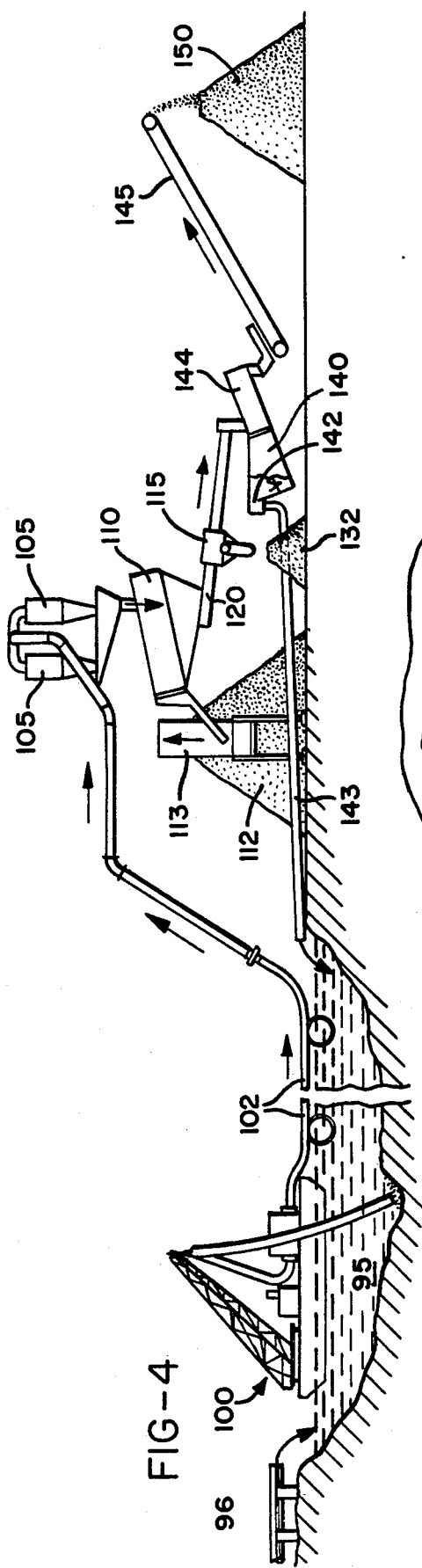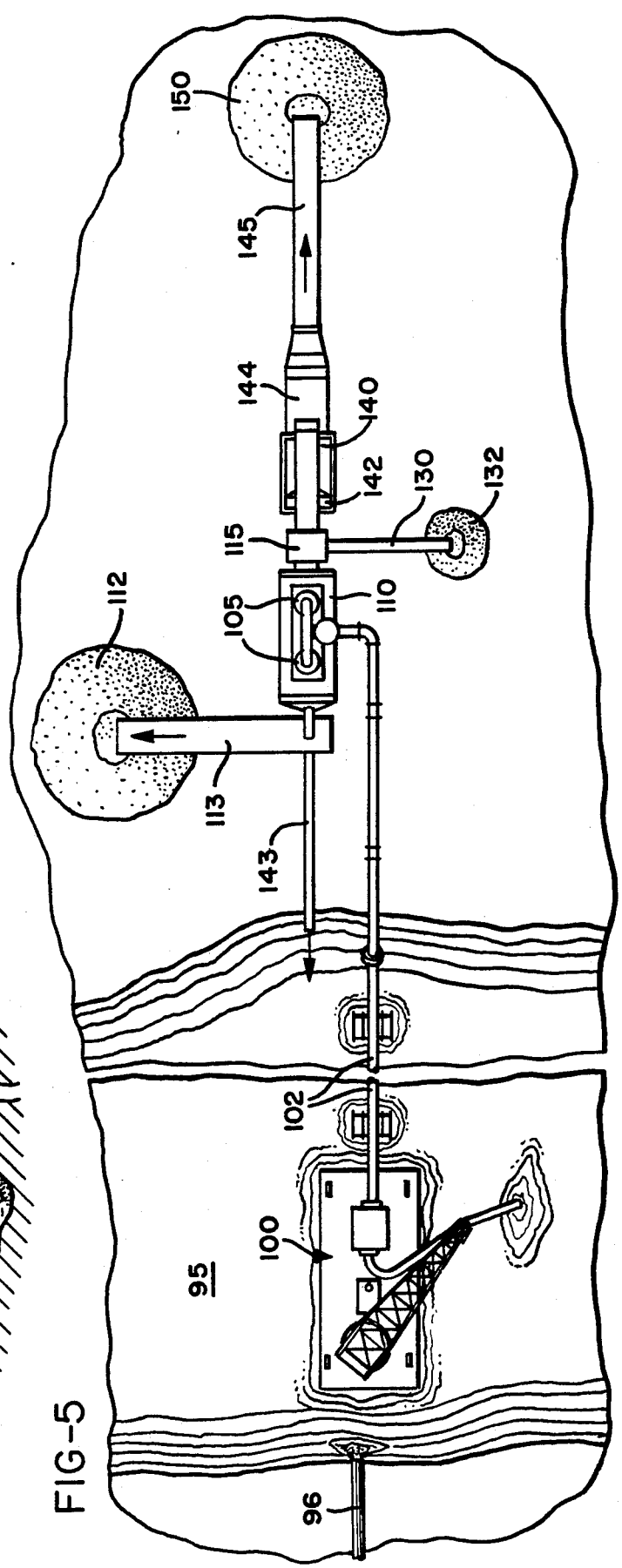

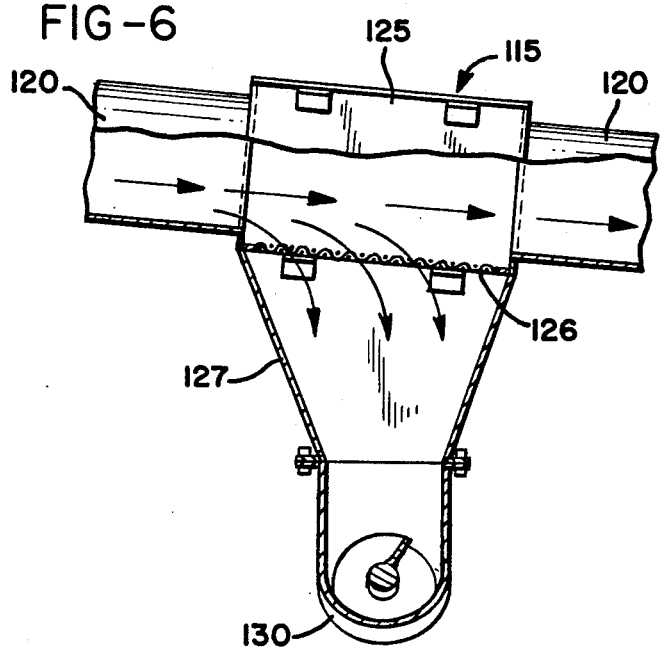
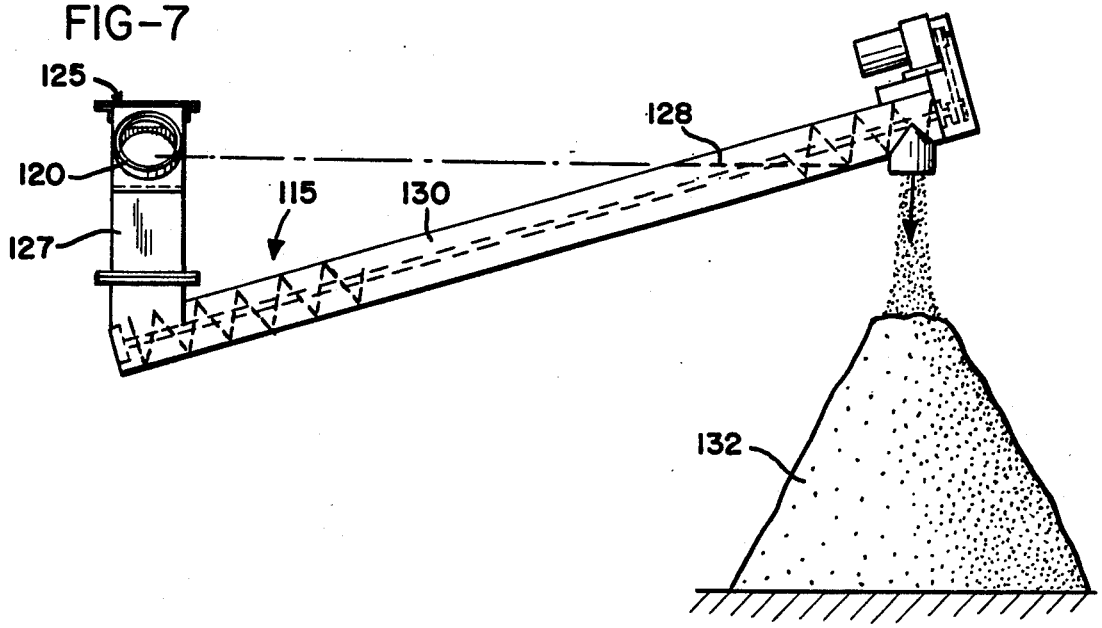

LIGHTWEIGHT AGGREGATE

BACKGROUND OF THE INVENTION

This invention is directed to concrete products incorporating a lightweight aggregate consisting primarily of bottom or base ash recovered from the combustion of pulverized coal in a dry bottom type furnace and to such bottom ash and to a method of producing the same for use as a lightweight aggregate in concrete products.

A wide variety of materials has been used in the past as lightweight aggregates in the manufacture of concrete products. Such aggregates as are used in ready-mix concrete must meet ASTM:C330 specifications. When lightweight aggregates are used in hollow-load bearing concrete masonry units, commonly known as concrete blocks, they must meet ASTM:C331 specifications. When a lightweight aggregate is used in insulating concrete it must meet ASTM:C332 specifications.

Natural occurring materials which have been used as lightweight aggregates include pumice, scoria, and volcanic ash. Also, various processes have been devised for expanding, calcining, or sintering such products as furnace slag, clay, diatomite, perlite, shale, slate, vermiculite and fly ash. All of these products have been used in varying extents as lightweight aggregate materials, and their use has depended to a large extent on their relative availability as well as the cost of handling, preparation, and delivery. The expanding, calcining, or sintering procedures require the availability of energy in the form of heat or steam, and particularly the calcining and sintering operations require substantial quantities of heat at relatively high temperatures to effect the modifications or change in the structure to make the product useful for masonry or concrete products, to eliminate deleterious substances such as organic impurities, iron oxide, and unburned carbon. Examples in the patent literature of such substances include:

U.S. Pat. No. 2,105,324: cinders, puffed slate, bloated or burned clay or shale, popcorn-slag, dry granulated slag.

U.S. Pat. No. 1,800,024: volcanic ash, ground cinders, fine ground pumice or sand.

U.S. Pat. No. 3,096,188: granular slag.

U.S. Pat. No. 3,362,837: expanded pumicite.

U.S. Pat. No. 3,245,812: ground oil shale ash.

Certain by-products of the burning of coal have been used widely as lightweight aggregate materials. One of the earliest coal products used was the clinker or cinder formed from burning lump coal on grates in broiler furnaces or the like, as disclosed in U.S. Pat. Nos. 89,311 of 1869, 145,277 of 1873, 642,301 of 1900, 664,710 of 1900, 770,083 of 1904, and 991,419 of 1911. More recently the available cinder product has been a by-product of burning crushed coal on travelling grates, under-fired grates or throwing stoker systems. Cinders, as a concrete aggregate, have fallen generally into disuse since the concrete products, particularly concrete blocks made with cinders, are unsuitable for outside use due to their porosity, low compressive strength, and their tendency to stain. ASTM:C90 defines the specifications for concrete block, and cinder blocks have been generally relegated to grade S, that is, limited use above grade in exterior walls with weather protective coating and in walls not exposed to the weather.

In the 1920's a more effective method of firing power plant boilers came into use consisting of the pulverizing of the coal into a fine powder, the addition of a primary air, and the burning of the coal powder substantially in a suspended state within the furnace. Such coal is pulverized in a rolling mill to the point where approximately 70 to 80 percent passes through a 200-mesh screen, is conveyed from the pulverizer with air into the furnace, and combustion takes place almost instantly while the fine coal particles are in a suspended state. This method of burning coal has come into wide use throughout the country due to it increased efficiency of combustion. The ash content of the coal, which may vary from a low of about 4 percent to a high of about 20 percent or more, is subject to the intense heat of combustion which may run between 2000° and 2800°F. Most of the ash is in the form of fly ash: the discrete sphere-like particles which are convected upwardly with the flue gases and are separated therefrom by electrostatic and/or mechanical collectors. The production of the large quantity of fly ash has presented substantial disposal problems to the public utilities since only a small part of this material is commercially used. The remaining or unutilized fly ash is frequently carried by water into a large holding or sluicing pond where the material settles and may later be removed by dump trucks to a land fill. Due to the nature of the fly ash particles, it has found use both as a pozzolan and as a lightweight aggregate. In the latter form it has been pelletized, sintered, and then crushed and screened to provide proper gradation and is a good aggregate material.

However, the manufacture of a lightweight aggregate from fly ash requires the employment of energy as well as machinery for pelletizing, or extruding, drying, and then firing on a sintering grate at approximately 2200°F. The resultant product is similar in nature to expanded shale and clay. U.S. patents which deal with the use of fly ash alone or in combination in concrete products and with the treatment of fly ash for its use in concrete products include the following:

U.S. Pat. No. 2,250,107 of 1941: fly ash used in its natural state in large quantities as a substitute for cement. Examples are also given where cinders were added as coarse aggregates.

U.S. Pat. No. 2,987,408 of 1961: forming a pozzolanic material using a specific magnetic separation to remove magnetic particles.

U.S. Pat. No. 3,030,222 of 1962: fly ash nodulized with a binder of sewage sludge and fired.

U.S. Pat. No. 3,192,060 of 1965: combining fly ash with alkaline earth reactants, pelletizing, and curing to form a lightweight aggregate.

U.S. Pat. No. 3,328,180 of 1967: pelletizing fly ash, drying the pellets, firing the pellets to an ignition temperature, cooling, crushing and refiring at a temperature between 1000° and 2000°F.

U.S. Pat. No. 3,669,701 of 1972: an oil well cement uses hollow cenospheres (float ash) as a lightweight aggregate.

U.S. Pat. No. 3,759,703 of 1973: mixing fly ash with calcium carbonate, firing and heating to a temperature of at least 1500°C to form a molten slag, water quenching, and grinding to obtain a hydraulic binder.

U.S. Pat. No. 3,782,985 of 1974: using fly ash cenospheres as a lightweight aggregate.

Boux, "Canadians Pioneer New Fly Ash Processing System", *Minerals Processing*, March 1969, (pp. 16–19).

When coal is burned in pulverized form in a furnace, such as that used in the generation of steam at power plants, a major portion of the ash content of the coal is expelled as fly ash while a minor portion of the ash content, which may run as high as 40 percent, for some types of coal or furnaces, down to as low as 10 percent with other coals or furnaces, collects on the furnace walls or falls or runs to the furnace bottom and it is collected and removed from the furnaces by various arrangements. Two types of pulverized coal burning furnaces have come into general use and include the slag or wet bottom furnace on the one hand and the dry bottom furnace on the other hand. Each produces a distinctively different bottom ash.

In the slag or wet bottom cyclone furnace, the ash content which is collected at the bottom of the furnace is maintained in a liquid condition by maintaining a temperature on the slag well above its fusion temperature. Such slag temperatures may be from 1900° – 3000°F. A slag tank or water filled pit is positioned below the furnace to receive the tappings of molten slag from the furnace.

The resulting product has become known in the industry as wet bottom boiler slag or bottom slag. It is glassy and angular in appearance, resembling angular crushed dark-colored glass. Boiler slag has found extensive use in asphalt paving mixtures and has been promoted as an aggregate for surface de-slicking in bituminous concrete. It has also been used as a convention aggregate in the manufacture of concrete blocks and as a sandblasting material. It is usually relatively heavy in weight, exceeding 65–70 lbs. per cubic ft., and for this and other reasons has not been suitable as a qualifying lightweight aggregate as defined by relevant ASTM specifications.

The dry bottom furnace, formed with a hopper bottom, has a sufficient cooling surface so that the ash which impinges on the furnace walls or on the hopper bottom is solid and is essentially dry. These furnaces generally have an open grate at their bases and below the open grate there is generally provided a water-filled ash pit to receive the ashes from the furnace.

A certain amount of molten slag will also form on the internal walls of the boiler and will find its way into the ash pit. However, a large portion of the dry bottom ash is collected in an essentially dry state and thus has physical characteristics which distinguish it from wet bottom slag. This is due to the fact that during the combustion of pulverized coal, some of the molten ash particles are heavier and fall to the bottom where they cool and are collected dry in the form of discrete spheres. Other smaller molten ash particles tend to agglomerate and fuse together and thus form discrete lumps or masses which become too heavy to be entrained or captured in the flow of combustion gases through the furnace, and these larger particles also fall to the bottom. In the wet bottom furnace, they simply fall into the slag pool and lose their individual characteristics. However, in the dry bottom furnace, they generally retain their spherical or agglomerated-spherical identity. Thus, while dry bottom ash may have in it some angular parts which have a porous surface, a substantial portion of the dry bottom ash has the appearance of a fine sand and when examined under magnification, the spherical nature of these particles may be observed and it can be noted that they appear essentially to be internally porous rather than externally porous, and the predominant material is light in color with a sandpaper-like surface texture.

The utilization of both wet bottom slags and dry bottom ashes, particularly in the art of highway construction, as an aggregate in cement stabilized road bases, is described in Seals et al, "Bottom Ash: An Engineering Material", *Journal of Soil Mechanics and Foundations Divisions, Proceedings of the Society of Civil Engineering*, April, 1972, pp. 311–325; Moulton et al, "Utilization of Ash from Coal Burning Power Plants in Highway Construction", reprint from *Highway Research Record* 430 by the National Ash Association Inc. (undated); Moulton, "Bottom Ash and Boiler Slag, Ash Utilization Proceedings", Third International Ash Utilization Symposium, *U.S. Bureau of Mines Information Circular* 8640, pp. 148–169, 1973; and Blocker et al, "Marketing Power Plant Aggregates as a Road Base Material", *U.S. Bureau of Mines Information Circular* 8640, pp. 208–233.

In the dry bottom furnace, the ash is collected, as noted above, in an essentially dry state and is dumped or collected in a water-filled ash pit. From there it is carried by water from time to time or continuously into a sluicing pond. Frequently a pair of crusher rollers at the ash pit crush the larger chunks of ash down to a size approximately 1½ inch maximum. In the sluicing pond, the ash is eventually drained of its water content as the pond fills, and the solids may be removed and hauled in dump trucks to a land fill.

During the burning of the coal, some of the ash tends to accumulate on the surface of the boiler tubes. This material is known to be rich in sulfur trioxide. From time to time, the tube ash is removed by water or steam jets or by acid bath, where this material falls to the collection apparatus at the bottom of the furnace and is then sluiced out into the pond with the bottom ashes.

SUMMARY OF THE INVENTION

I have found that by properly selecting and/or processing dry bottom ash, it may be employed as the basic lightweight aggregate in the manufacture of concrete masonry units, structural concrete, and insulating concrete and fully meets the strict requirements of the corresponding ASTM specifications. It consists of inorganic materials including iron oxide, silicon dioxide, alumina, magnesium oxide, titanium dioxide, and calcium oxide. It may also contain some sodium, and potassium oxides, chloride, sulfate, and phosphorous as acidic constituents. Thus this bottom ash forms the basic ingredients of the lightweight aggregate of this invention. My invention centers around the discovery of certain properly collected and/or selected dry bottom ashes which fully meet the requirements of these specifications for a lightweight aggregate for concrete mixtures and in fact may be so used with a minimum of follow-up handling or processing. The process does not require the application or energy in the form of heat as does the processing of fly ash or certain other aggregate materials. Stated another way, my invention centers around the recognition of the possible presence of certain deleterious substances found in pond ash from dry bottom furnaces and to methods of collecting and processing dry bottom ash and pond ash from dry bottom furnaces to assure a product free of these deleterious substances and which is inert and otherwise fully meets the applicable specifications.

The usual dry bottom furnaces installed at electrical power plants and similar utility plants produces three by-products which are usually considered as waste: (1) an excess of fly ash, which may be from 50–90 percent of the ash content of the coal, (2) bottom ash, and (3) iron pyrites and other trash elements in the coal. Since these are commonly considered by the power plants as waste products, they are frequently but not always, sluiced or dumped together into the pond along with the intermittently dumped boiler tube slag as previously described.

An excessive fly ash constituent in the pond is deleterious to a lightweight aggregate as it increases the mass of the product and it presents too high a proportion of fines to meet the specifications.

The presence of the sulfur trioxide is deleterious as it causes an undesired reaction with lime (calcium hydroxide) to form calcium sulfate. This effect is known as "aggregate growth" and the internal stresses severaly weaken the concrete product. Also, sulfur trioxide in the pond water causes a weak sulfurous and sulfuric acid which may react with the ferric elements in the pond to form marcasite ($FeS_2$). The latter then becomes another source of sulfur in the aggregate which can also react with the lime.

The presence of iron pyrite is particularly deleterious. Pyrites ($FeS_2$) are found naturally in coal and may comprise a fraction of 1 percent up to as high as 7 percent or more of the coal by weight. 2 percent iron pyrite and 10 percent ash content is not unusual in some coals, so that if a power plant burns 10,000 tons of this coal a day, it will produce 200 tons of pyrites and 1,000 tons of ash, 800 tons of which is typically fly ash and 200 tons is bottom ash. In this situation, the pond ash could contain equal amounts of iron pyrites and bottom ash by weight. Although some of the pyrite is found naturally in coal in microscopic or molecular form, a major portion of the pyrite content of the coal is granular, that is, in the form of discrete nodules which exceed 200-mesh. Many of these nodules appear to be about the size of small lead shot (−⅜) on up to 1 inch or more in diameter. Pyrite nodules are exceedingly hard (hardness 6–6.5) and cannot be crushed by the pulverizing rollers, and are relatively heavy (sp. gr. 4.8 to 5.2). They are thus separated at the pulverizer and are commonly, but not always, recombined with the bottom ash by sluicing into the pond. The small percentage of iron pyrite which is carried by the pulverized coal into the furnace (as well as the organic sulfur content) is oxidized when burned. The pyrites are converted into ferric oxide and sulfur dioxide gas. The resulting ferric oxide content in the bottom ash has been found to be generally unobjectionable.

The iron pyrites, themselves, are not thought to contribute significantly to aggregate growth as this form of mineral is reasonably stable and has little reaction with lime even when subjected to the exothermic heat of concrete setting up. Concrete blocks have been made containing iron pyrites which fully meet the strength requirements. However, I have discovered that a bottom ash lightweight aggregate which contains in excess of 1 percent iron pyrite may technically meet the ASTM specifications for lightweight aggregate including the staining index of ASTM:C641 and yet be wholly unsuitable as a lightweight aggregate. When concrete products made with more than 1 percent iron pyrite are subjected to wetting and accelerated drying, I have found that distinct rust stains appear on the surface of the concrete product rendering it useless for exposed use, and I have found that this staining or rusting occurred even though the aggregate produced only a "light stain" index when tested according to ASTM:C641.

I have found in dry bottom installations, that if the bottom ash is collected immediately from the bottom of the furnace, prior to being sent to the sluicing pond, it will be essentially free of iron pyrite and sulfur trioxide. Also, due to the natural convective separation within the furnace it will be essentially free of excess fines so that no more than 25 percent thereof will pass a 100-mesh screen. Thereafter, a classification and/or crushing operation may be employed to provide the required size distribution, generally eliminating the +⅜ inch material. The resulting aggregate is lightweight, that is less than 65–70 lbs. per cubic foot, is inert and non-reactive, and is non-staining, even though it may have as much as 5 to 25 percent iron oxide content and is fully suitable for use as a lightweight aggregate as defined above. Also, it will be almost totally free of iron pyrite since the nodules have been separated at the crusher and have not been recombined as a waste product. It is particularly important that only bottom ash be collected, and that the boiler tube slag or ash which is stripped from time to time by steam or water jets, and which is known to contain a high percentage of sulfur trioxide, be diverted. Although ASTM:C618 specifies a maximum sulfur trioxide content of 5 percent (for fly ash pozzolan) I consider it to be an absolute maximum for a lightweight aggregate and through experience I have found a negligable amount of free sulfur trioxide when the aggregate is collected and/or processed according to my invention.

I also recognize that the huge quantities of pond ash presently available can be salvaged and converted at a low cost into a suitable lightweight aggregate. Generally, this consists of the simple hydraulic separation or classification of the heavier iron pyrite and marcasite from the ash. If a high natural sulfur trioxide content is also found, in excess of 5 percent, the ash cannot be used. But if it has been allowed to settle in water for a period of time or otherwise subjected to washing, the sulfur trioxide content will become negligible and will not adversely affect the aggregate. After hydraulic separation of the pyrites, the aggregate can be crushed if necessary and screened to provide the desired gradation. If the fly ash has also been diverted in the pond, it can also be removed by washing and/or classifying, to reduce the fines to a maximum of 25 percent passing a 100-mesh screen.

It is accordingly an object of my invention to provide an improved lightweight aggregate in which a major portion thereof consists of bottom ash from dry bottom pulverized coal burning furnaces containing not more than 5 percent sulfur trioxide and less than 1 percent iron pyrite.

Another object of my invention is that of a concrete product which incorporates a lightweight aggregate as defined above.

A still further object of my invention consists of the method of producing a lightweight aggregate useful in making a concrete product which consists of the pulverizing of coal and the separation therefrom of the iron pyrites, the burning of such coal in suspended state in a dry bottom furnace to collect the heavier ash particles at the bottom thereof, and the crushing and grading of the collected bottom ash to remove therefrom the fraction which substantially exceeds ⅜ inch.

A further object of my invention consists of the reclamation of pond ash to provide a useful lightweight aggregate for concrete mixes and products.

These and other objects and advantages of the invention will be apparent from the following description, the accompanying drawings, and the appended claims.

BRIEF DESCRIPTION OF THE DRAWINGS

FIG. 2 is a plan view of the lightweight aggregate dry processing plant for use with the installation of FIG. 1;

FIG. 3 is an elevational view of the dry processing plant of FIG. 2;

FIG. 4 is an elevational view of a wet processing plant for recovery of a lightweight aggregate from pond ash;

FIG. 5 is a plan view of the plant of FIG. 4;

FIG. 6 is a sectional view looking transverse to the direction of main flow of a hydraulic separator for use in the wet processing plant of FIGS. 4 and 5; and FIG. 7 is a side view of the hydraulic separator of FIG. 6 showing the sand screw and the pyrite pile.

DESCRIPTION OF THE PREFERRED EMBODIMENTS

Figure 1:
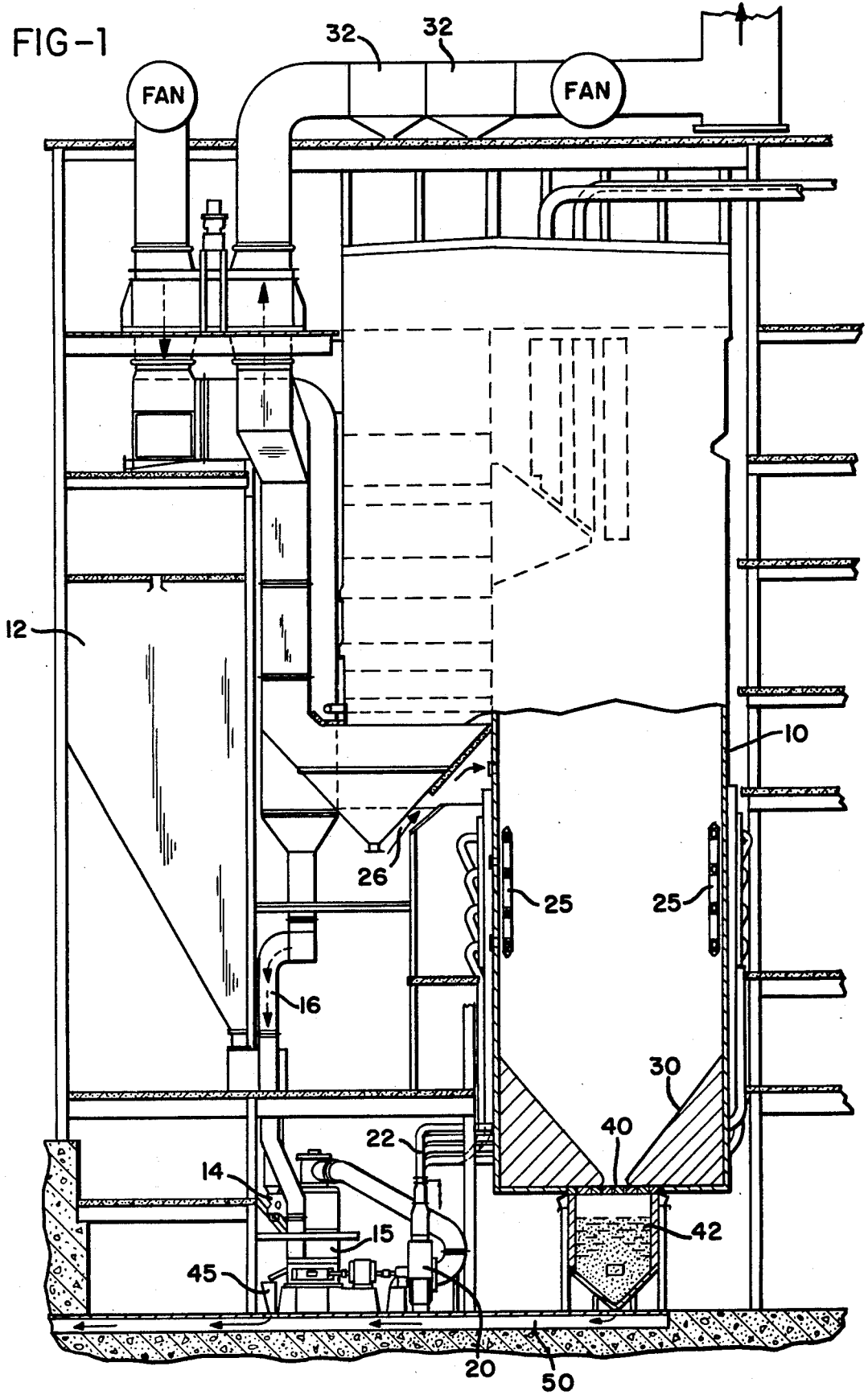
FIG. 1 is a diagrammatic representation of a dry bottom furnace installation in an electric power plant which produces the dry bottom ash used in my invention.

FIG. 1 is a simplified diagram of a furnace and boiler of the dry-bottom type which burns pulverized coal, in which the furnace itself is shown at 10. The coal is retained in a bunker 12 and delivered by a coal feeder 14 to a pulverizer 15 where the coal is reduced so that approximately 70–80 percent thereof passes through a 200-mesh screen. A source of hot air is delivered by a duct 16 to the pulverizer 15. The pulverizer 15 may be of any of a number of types of which are in general commercial use in electric power plants, typical examples of which are the Babcock and Wilcox type MPS Mill and the Combustion Engineering "Raymond" roller mill. A full description of the former may be found in "Steam, Its Generation and Use" (38th Ed., 1972) published by Babcock and Wilcox, 161 East 42nd Street, New York, N.Y. 10017, and the latter is described in Lorenze, "Combustion Engineering", (1951) published by Combustion Engineering and Superheater, Inc., 200 Madison Avenue, New York, N.Y.

The coal which has been pulverized to a fine powder in the pulverizer 15 is delivered by an exhaust fan 20 through ducting 22 to a vertical stack of tangential burners 25. Secondary air to support combustion is applied to the tangential burners 25 through a duct 26. The burners 25 are located at approximately ¼ of the height of the furnace 10, and are thus spaced well above the tapered furnace bottom 30. The combustion of the powdered coal is almost immediate and takes place in a state of suspension. As previously noted, the ash content of the coal consists to a large extent of fly ash, and in a typical dry bottom installation, 70–80 percent of the fly ash will be carried out of the furnace past the boiler tubes by the convective air current and will be removed by suitable mechanical and/or electrostatic collector apparatus. Such apparatus is diagrammatically illustrated at 32.

The heavier ash particles and the particles which have agglomerated and have become heavier, fall to the dry bottom at the grates 40 where they fall through the grates into a water filled ash pit 42 for collection. Also, a certain amount of slag runs down the walls of the furnace but this slag, by the time this reaches the grates 40, has generally cooled, and a portion of the slag will also find its way into the pit 42.

The pulverizer 15 provides means for separating iron pyrites, tramp iron, and other foreign material too heavy to be lifted by the convection air in the pulverizer. In the case of crushed coal, this trash material generally consists of iron pyrite which, of course, is substantially heavier than coal and which generally is too hard to be crushed or ground by the rollers. In a conventional furnace installation, the pyrites are expelled from the pulverizer and collected in a pyrite box 45 for disposal. The small fraction of iron pyrite or related ferric materials which is carried with the pulverized coal is oxidized in the heat of the furnace.

Furnace installations of this type are generally provided with sluiceways formed within the concrete floor of the power plant. In FIG. 1, there is illustrated a typical sluiceway 50 which runs beneath the ash pit 42 and the pyrite box 45. A supply of water is provided to the sluiceway, and the bottom ashes from the pit 42 are first run through a pair of coarse crushing rollers merely to reduce the size of the larger slag and/or ash particles so that the same can be handled in the sluiceway, usually taken to 1½ inches in diameter, and from there the ash is disposed of either on a continuous or intermittent basis into the sluiceway 50. The sluiceway 50 leads to a remote disposal pool.

The pyrites in the box 45, on the other hand, are generally accumulated and are dumped into the sluiceway 50 on an intermittent basis and carried by water to the pond. Similarly, the boiler tube ash which accumulates on the boiler tubes themselves is stripped off from time to time with steam or water jets, or acid, usually when the furnace is shut down and this ash, which may contain a high percentage of sulfur trioxide is also dumped into the sluiceway 50 for disposal out of the power plant and into the pond. Also, the collected fly ash may be put into storage bins. The economizer ash (a coarser form of fly ash) is also temporarily stored. Usually an electric power plant produces an excess fly ash over which it can sell or otherwise gainfully dispose of, and the excess ash is commonly sluiced to the disposal pond.

FIGS. 2 and 3 show a dry processing plant by means of which I salvage and separate the dry bottom ash from the deleterious substances produced by the coal burning installation of FIG. 1. The sluiceway 50 terminates in an individual sluice pipe 52 leading to the ash disposal pond 54 as shown in FIG. 2. Four disposal pipes 52 are shown corresponding to four furnace-boiler installations. Each pipe 52 is provided with solenoid-operated diverter valves 55 by means of which the controller in the power plant can divert the effluent from the pipe 52 into the pond 54. When the diverter valve 55 is closed, the effluent is disposed through feed pipes 60 in one of a pair of side-by-side holding bays 58. The back walls 61 of the bays are provided with drain openings 62 through which the excess water may flow back into the pond 54. The holding bays 58 are arranged so that while one is being filled the other is draining. The bays are open at the front, as shown, to permit access thereby by suitable loading apparatus. A second diverter valve 65 is provided in the line 60 so that the power plant operator can select which of the holding bays 58 is to be filled. Thus, during night and weekend operations, the diverter valve 65 may be operated to assure that one or the other of the bays 58 will be filled with bottom ash.

The diverter valves 55 permit the power plant operator to divert deleterious substances. Thus, these valves will be operated to divert the iron pyrites which have been collected by the box 45 when these are being sluiced out of the plant to assure that none of the iron pyrites find their way into the bays 58. Similarly, during boiler tube cleaning operations, during shutdown of the plant, and during fly ash disposal, the valves 55 are operated to assure that these materials are diverted to the pond 54. In this manner, only bottom ash from the pit 42 is collected and accumulated in the bays 58. This bottom ash is essentially totally free of iron pyrites, excess fines, and excessive sulfates.

I have found that dry bottom ash collected as described as described above directly from a dry bottom coal burning furnace is entirely suitable as a lightweight aggregate for concrete mixtures. If it is prevented from entering the pond, it will have substantially no sulfur trioxide or other sulfate content. Further, it will have a gradation, with simple processing and blending, if necessary, and a dry weight, such as to meet the ASTM specifications for such an aggregate. Advantageously, the convective selection in the furnace, itself, has removed from the ash content of the pulverized coal a substantial portion of the fines so that in the bottom ash recovered by this invention no more than 25 percent of this material will pass a 100-mesh screen, and typically, the 100-mesh material will be 10 percent of the dry bottom ash. The following is an analysis by typical ranges of constituents in dry bottom ash:

| | | | |
|---|---|---|---|
| $Al_2O_3$ | = 15–35% | $FeS_2$ | = 0–1% |
| $SiO_2$ | = 40–55% | $MgO$ | = 1–3% |
| $Fe_2O_3$ | = 5–25% | $CaO$ | = 1–5% |
| $SO_3$ | = 0–5% | $TiO_2$ | = 1–3% |
| | $C$ = 0–5% | | |

In FIGS. 2 and 3 I have shown a dry processing plant for sizing and classifying the ash from the holding bays 58. The drained material stock piled within the bays may be loaded out by any suitable front end loader 68 and carried to the hopper 70 of a belt feeder 72 where it is carried by a conveyor 74 to a classifier 76 such as a vibrating screen. Typically, the vibrating screen will separate the +⅜ inch material and will pass the —⅜ inch material. The +⅜ inch material may be delivered on a belt 78 directly to a stock pile 80, or may be applied through a pair of crushing rollers 82 which are adjusted to reduce this material to 3/16 inch and then stock piled as indicated at 84.

The —⅜ inch material passing the vibrating screen 76 is carried from the classifier and is stock piled by a conveyor 86 as indicated at 90. The pile 90 will thus contain material —⅜ inch down to dust and generally qualifies without further gradation as a "combined fine and coarse aggregate — ⅜ inch to 0 inch" as specified in ASTM:C330, 331, and 332 and will have a dry loose weight of approximately 65 pounds per cubic ft. or less. In some cases, the dry loose weight may somewhat exceed 65 pounds but will not exceed 70 pounds per cubic ft. In this case, the material in the pile 90 can usually be qualified without substantial further gradation as a "fine aggregate" in accordance with the above-identified specifications.

Suitable gradations in the material taken from the pile 90 may be easily made by blending. For example, a material may be taken from the pile 84 and blended to create a somewhat lighter aggregate with a size distribution falling within the range defined for a "combined fine and coarse aggregate." Also, fly ash may be blended into the mix if a high percentage of fines is desired, such as where a smoother textured concrete product is desired. The material in stock pile 80 may also be sized to eliminate that which exceeds 1 inch and used as a "coarse aggregate" in structural concrete mixes, or may be used for fill, road base stabilization, or the like.

As noted above, my invention also resides in the utilization of pond ash itself, which pond ash may contain substantial quantities of iron pyrite nodules, and fines in the form of fly ash, which have been dumped or sluiced into a disposal pond. The deleterious sulfur trioxide and other sulfates are generally water soluble, and thus may be eliminated as a factor by the employment of the wet processing plant shown in FIGS. 4 and 5. Here the pond 95 is fed by one or more lines 96 leading from the power plant. A typical power plant may use up to 250,000 gallons of water to sluice 20 tons of ash to the pond. The pond ash can be removed from the pond while the pond is in active use by any suitable means, and for this purpose I have illustrated a pontoon-mounted dredge 100. Pond ash and water are conveyed by means of a pipe 102 to the inlet of one or more hydrocyclones 105. The purpose of the hydrocyclones is to remove the excess pond water, and a portion of the fine material. Typically, 3000–6000 gallons of water will be removed by the dredge 100 in removing 5–10 tons of pond ash. The excess water and a portion of the fines removed by the hydrocyclones 105 may be returned to the pond 95.

At this point, I find it advantageous to remove the larger fraction such as +⅜ inch, by means of a vibrating screen 110. Experience has shown that a substantial portion, often in excess of 50 percent, of the iron pyrite content of the pond ash comprises material which will not pass a ⅜ inch screen and therefore removal of the +⅜ inch material will, at the same time, result in an elimination of a substantial portion of the pyrite content. The +⅜ inch material from the top of the screen 110 is conveyed laterally to the pile 112 by a conveyor 113 as shown in FIG. 5.

I now apply the —⅜ inch material to a suitable hydraulic classifier 115 to separate the heavy particles in excess of 4.0 specific gravity from the pond ash. Pyrite and marcasite have a specific gravity in excess of 4.5, in the range of 4.8 to 5.2. A suitable hydraulic classifier for this purpose is described in U.S. Pat. No. 3,385,432.

In FIGS. 6 and 7, there is shown a simpler form of underwater classifier 115 which is particularly useful in the separation of the substantially heavier pyrite components from the bottom ash. The —⅜ inch material from the screen 110 is passed through a conduit 120 and into a box 125. The bottom of the box is provided with a ⅜ inch wire mesh screen 126. A hopper 127 beneath the screen leads downwardly to the inlet of an upwardly inclined sand screw 130. The entire box 125 as well as a major portion of the length of the screw 130 operate under water as shown by the water line 128 in FIG. 7. The heavier materials passing from the conduit 120 into the box 125 fall through the screen 126 and into the hopper downwardly to the entrance of the screw 130 where they are removed continuously by the screw conveyor to a pyrite pile 132. Even though some of the lighter fraction may also pass through the screen 125, this lighter fraction will be displaced by the heavier pyrites, and in effect, will float to the top and be carried through the box 125 with the remaining pond ash material.

The lower end of the conduit 120 leads to a further hydraulic classifier to remove the remaining fine material in excess of 25 percent. I use a weir box 140. The weir box 140 is provided with an overflowing weir wall 142, and the overflowing product is lead by a pipe 143 to disposal, which may be back into the pond. The weir box 140 functions to separate the lighter and finer fraction consisting of the extreme fines which generally are less than 100-mesh in size, to remove this excess of fines from the pond ash material. This apparatus is particularly useful where the pond ash includes a mixture of fly ash from the mechanical or electrostatic precipitators.

The remaining material is carried by a second sand screw 144 from the box 140 to de-water the material and present it onto the surface of a conveyor 145 for depositing in a pile 150. The pile 150 will now contain a useful lightweight aggregate with a size distribution of ⅜ inch down to 100-mesh size and smaller. It is free of pyrites and due to the washing provided by the excess water and de-watering which occurs at the screen 110 and the screw 144, this material is also substantially free of $SO_3$. If further fines are required in the aggregate, such as may be desired from time to time to provide a finer texture to the concrete product, the weir 142 may be approximately adjusted to retain more of the fine material, or alternatively, fly ash may be blended with the material of the pile 150 to achieve the desired balance of fine-to-coarse material.

In order to demonstrate the usefullness of dry bottom ash as a lightweight aggregate in the manufacture of concrete products, a test was undertaken in which thirteen masonry units of the type described in ASTM:C-90 were made in accordance with each of the four mix designs as identified below in Table I.

Table I

|  | Control | Mix No. 1 | Mix No. 2 | Mix No. 3 |
|---|---|---|---|---|
| Cement | 575 | 575 | 575 | 575 |
| Fly Ash | 175 | 175 | 175 | 175 |
| Bottom Ash | — | 2400 | 3400 | 3900 |
| Fine Haydite | 2400 | — | — | — |
| Coarse Haydite | 1000 | 1000 | — | — |
| Sand | 1000 | 1000 | 1000 | 500 |
| Plasticizer (oz.) | 22 | 22 | 22 | 22 |
| Blocks per Batch | 168–183 | 164 | 148 | 155 |
| 1 day strength ave.* | 1360 | 1300 | 1240 | 1215 |
| 3 day strength ave. | 1340 | 1355 | 1335 | 1155 |
| 7 day strength ave. | 1410 | 1380 | 1430 | 1330 |
| 28 day strength ave. | 1340 | 1460 | 1550 | 1430 |
| Absorption (ave.) lbs. per cubic foot | 12.7 | 10.6 | 11.2 | 12.2 |
| Specification — ASTM:C-90 | 18 max. | 18 max. | 15 max. | 15 max. |
| Unit Weight (ave.) Lbs. per cubit foot | 91.9 | 101.4 | 109.0 | 107.1 |
| Specification — ASTM:C-90 | 85–104 | 85–104 | 105–124 | 105–124 |
| Ave. Weight of Block (lbs.) | 27.95 | 30.38 | 33.28 | 32.64 |

*ASTM:C90 states that the unit must have 1000 PSI strength at time of delivery for grade N blocks.

In the "control" mix, the cement blocks were made with a commercial, lightweight expanded shale aggregate sold under the trademark "Haydite", a product of Hydraulic Press Brick Company, Cleveland, Ohio 44131. The fly ash constituent in each of the four mixes was added as a pozzolan. The bottom ash constituent of mixes 1, 2 and 3 was taken from the disposal pond of the Stuart Station of the Dayton Power and Light Company of Aberdeen, Ohio. The pond ash was screened on a ⅜ inch screen and used without gradation or classification and without separation of the pyrites. It contained no fly ash. A sample of the aggregate used in mixes 1, 2 and 3 was tested to determine compliance with ASTM:C-331-69 for grading, unit weight, deleterious substances, and concrete-making properties. The results of this test are set forth in Table II.

Table II

| Item | Bottom Ash | ASTM: Specification — C-331 |
|---|---|---|
| Oven Dry Weight | 67.3 lbs per c.f. | 70 lbs. per c.f. max. |
| Organic Impurities | Clear | Clear |
| Staining Index | 30 | 80 |
| Clay Lumps | none | 2.0 per cent max. |
| Loss on Ignition | 5.7 percent* | 5 percent max. |
| Friable Particles | 9.1 percent | none stated |
| Gradation (Dry Sieve) | | |

| Sieve Size | ⅜ | 4 | 8 | 16 | 30 | 50 | 100 | 200 |
|---|---|---|---|---|---|---|---|---|
| Bottom Ash | 100 | 82* | 60 | 41 | 28 | 19 | 10 | 4 |
| Specifications for "Fine Aggregates" | 100 | 85–100 | | 40–80 | | 10–25 | | |

It will be noted in reference to Table II that the lightweight dry bottom ash exceeded the gradation test for a "fine aggregate" only in that an excess of 3 percent was retained on the No. 4 screen and that the Loss on Ignition exceeded the specification by .07 percent. It met the ASTM gradations for a "combined fine and coarse" aggregate.

The masonry units of each of the four mixes were tested for absorption in accordance with ASTM:C-90-70, and the results of Table I indicated that each of the three mixes in which the bottom ash was used as the lightweight aggregate met the requirements of these specifications.

It should be noted in Table II that the bottom ash used in mixes 1, 2 and 3, when subjected to the staining test of ASTM:C641 produced only a "light stain" index of 30 even though it was later determined that this aggregate contained an unsuitable quantity of iron pyrite, substantially in excess of 1% by weight. The deleterious pyrite content was noted when two units of each of the four mixes were subjected to an accelerated staining test. In this test, the eight units involved were subjected to four cycles consisting of oven drying at 212°–239° F for eight hours, cooling for one hour, and soaking in clear water at room temperature for 15 hours. The specimens from mixes 1, 2 and 3 exhibit numerous rust stains on all surfaces while the specimens from the control mix did not exhibit any stain.

A further specimen of dry bottom ash was then obtained directly from the bottom of furnace No. 3 at the previously defined Stuart Station, which is a dry bottom furnace. This was made into a mix consisting of 2,000 grams of dry bottom ash, 300 grams of type 1A cement and sufficient water to hold the mix together which was tamped into two 8 × 8 × 1½ inch pans and cured in a moist oven for 24 hours. The resulting castings were subjected to 25 cycles of the previously defined accelerated staining test, and no visible stain was produced. Further, a specimen of the aggregate employed was subjected to ASTM:C-641 and produced a stain index of 10 which is less than "very light stain". Also, a further test using this dry bottom ash was tested for pop-out materials according to ASTM:C-151, "Test for Autoclave Expansion of Portland Cement." No pop-outs were detected.

A 100-day shrinkage test was run in accordance with ASTM:C-330 and ASTM:C-157 providing a shrinkage of 0.076%. The allowable shrinkage is 0.10%.

A further concrete mix using the dry bottom ash of the preceding paragraph was made for the purpose of performing twenty-eight day strength tests in accordance with ASTM:C-330. Concrete test cylinders were made in accordance with the following mix design:

| | |
|---|---|
| Cement | 470 lbs. |
| Fly Ash | 140 lbs. |
| Sand | 1200 lbs. |
| Bottom Ash | 900 lbs. |
| Water | 300 lbs. |
| Water Reducer | 3 oz. per 100 lbs. of cement and fly ash |
| Air Entraining Agent | 1 oz. per 100 lbs. of cement and fly ash |
| Unit Weight of concrete in plastic form | 119.8 lbs. per cubic ft. |
| Bulk Dry Unit Weight (ASTM:C-567-71) | 106.9 lbs. per cubic ft. |
| The average strengths were determined to be as follows: | |
| 3-day strength | 1060 PSI and 1110 PSI |
| 7-day strength | 1500 PSI and 1520 PSI |
| 28-day strength | 2600 PSI and 2650 PSI |

The above-identified test shows that a concrete mix using dry bottom ash as a lightweight aggregate exceeded ASTM:C-330 specifications for structural concrete. Also, the mix fully met the requirements of *The Manual of Concrete Practice, Part 1*, Sections 213-7, paragraphs 1.5 "Definition of Light Weight Aggregate Concrete" published by the American Concrete Institute, P.O. Box 4754, Readford Station, Detroit, Mich. 48219, in which are recommended a 28-day compression strength of 2500 PSI (minimum) and a dry unit weight of 115 lbs. per cubic ft. (maximum).

It will accordingly be seen that this invention provides a new lightweight aggregate which consists of essentially bottom ash derived from a dry bottom pulverized coal burning furnace. This aggregate is non-reactive as it contains no more than 5 percent sulfur trioxide and is essentially non-staining in that it contains less than 1 percent iron pyrite. The classification which occurs within the furnace itself, in the case of the embodiment of FIGS. 2 and 3, assures that no more than 25 percent of the resulting product will pass a 100-mesh screen. Preferably, this percentage is approximately 10 percent. In the case of the embodiment of FIGS. 4 and 5, the weir box 140 assures the elimination of the excess fines in the event that the pond ash may be contaminated by the discharge of fly ash therein from the precipitators.

In the case of the embodiment of FIGS. 2 and 3, the product is essentially free of iron pyrite as the nodules have been separated at the pulverizer, and the arrangement of the diverter valves 55 assures that they do not contaminate the material in the bays 58. However, where the material in the existing pond is reclaimed, the hydraulic classification apparatus used in this connection in the embodiment of FIGS. 4 and 5 removes the pyrites and other heavy particles from the products.

Basic concrete mixes for poured structural concrete as well as mixes for concrete masonry units may vary widely in the relative amounts of sand, cement, fly ash as a pozzolan, aggregate, and water. Generally, increasing the percentage of lightweight aggregate decreases the unit weight of the resulting concrete product but increases the cost of the product over that where only sand, gravel, or stone is used as the aggregate. Thus, mixes for masonry units (blocks) may have from 8–20 percent cement, 10–50 percent sand, and 25–90 percent lightweight aggregate. Mixes for structural concrete may have 8–20 percent cement, 10–50 percent sand, and 10–50 percent lightweight aggregate. In each, fly ash may also be used as a pozzolan. The dry bottom ash recovered and processed according to the methods of my invention may consist of the major portion of the lightweight aggregate used in such mixes, and is suitable for use as the entire lightweight aggregate of such mixes.

Also, while my invention is particularly useful as an aggregate in concrete block mixes with a maximum particle size of approximately ⅜ inch, my invention is not limited to this particular size gradation, and coarser material may often be used for specific applications and this material which does not exceed 1 inch may qualify as a "coarse aggregate" under the ASTM C-330.

While the processes and products herein described constitute preferred embodiments of the invention, it is to be understood that the invention is not limited to these precise processes and products, and that changes may be made therein without departing from the scope of the invention.

What is claimed is:

1. A lightweight concrete product having as its major ingredients a pozzolanic material including primarily Portland cement; sand; and a lightweight inorganic non-reactive aggregate formed of dry bottom ash, said major ingredients having the following approximate proportions:

```
pozzolanic material    - 8 to 20 per cent
sand                   - 10 to 50 per cent
aggregate              - remainder
``` said bottom ash aggregate consisting of dry bottom ash essentially as formed as the waste by-product of burning pulverized coal in a dry bottom furnace, said dry bottom ash containing no more than 5 per cent sulfur trioxide and less than 1 per cent iron pyrite by weight.

2. The product of claim 1 consisting of hollow load-bearing masonry units.

3. The product of claim 1 in which said bottom ash has a size such that approximately all passes a ⅜ inch screen with not more than 25 per cent passing a 100-mesh screen.

4. A concrete mix for making lightweight concrete masonry units, structural concrete or insulating concrete, having as its major ingredients a pozzolanic material including primarily Portland cement; sand; and a lightweight inorganic non-reactive aggregate formed of dry bottom ash, said major ingredients having the following approximate proportions:

```
pozzolanic material    - 8 to 20 per cent
sand                   - 10 to 50 per cent
aggregate              - remainder
``` said bottom ash aggregate consisting of dry bottom ash formed as a residue in dry bottom pulverized coal burning furnaces, said bottom ash being free of excess fines so that no more than 25 per cent thereof is less than 100-mesh size, and containing no more than 5 per cent sulfur trioxide and less than 1 per cent iron pyrite by weight.

5. The concrete mix of claim 4 particularly suited for making masonry units in which said dry bottom ash has a maximum particle size of approximately ⅜ inch.

6. The concrete mix of claim 4 particularly suited for making structural concrete in which at least a fraction of said dry bottom ash exceeds ⅜ inch but does not exceed 1 inch.

7. A concrete mix for lightweight concrete products having as its major ingredients a pozzolanic material including primarily Portland cement; sand; and a lightweight inorganic non-reactive aggregate formed of dry bottom ash, said major ingredients having the following approximate proportions:

```
pozzolanic material    - 8 to 20 per cent
sand                   - 10 to 50 per cent
aggregate              - remainder
``` said bottom ash aggregate consisting of bottom ash essentially as formed as the waste by-product of burning pulverized coal in a dry bottom furnace, said bottom ash being essentially free of fly ash and excess fines to have a size such that not more than 25 per cent thereof passes a 100-mesh screen.

* * * * *

UNITED STATES PATENT AND TRADEMARK OFFICE
CERTIFICATE OF CORRECTION

PATENT NO. : 3,961,973
DATED : June 8, 1976
INVENTOR(S) : Dennis A. Jones

It is certified that error appears in the above-identified patent and that said Letters Patent are hereby corrected as shown below:

Column 1, line 54, "broiler" should be -- boiler --.

Column 3, lines 32-33; "convention" should be -- conventional --.

Column 4, line 21, "pp. 208-233" should be -- pp. 208-223 --.

Column 5, line 16, delete "the" before sulfur; and line 31, insert -- bituminous -- before "coals".

Column 6, line 33, "negligable" should be -- negligible --.

Column 8, line 43, insert -- of -- after "excess".

Column 9, line 19, delete "as described" after "as described".

Column 12, Table I; "Unit Weight (ave.) Lbs. per cubit foot" should be -- Unit Weight (ave.) Lbs. per cubic foot --.

Column 12, Table II, at the end of the table insert -- *Denotes out of specifications --.

Signed and Sealed this

Seventh Day of September 1976

[SEAL]

Attest:

RUTH C. MASON
*Attesting Officer*

C. MARSHALL DANN
*Commissioner of Patents and Trademarks*